July 15, 1941.  L. W. PARKER  2,249,167
TELEVISION FILM PROJECTOR
Filed May 20, 1939   3 Sheets-Sheet 3

INVENTOR
LOUIS W. PARKER
BY
ATTORNEY

Patented July 15, 1941

2,249,167

UNITED STATES PATENT OFFICE 2,249,167

TELEVISION FILM PROJECTOR

Louis W. Parker, Astoria, N. Y., assignor, by mesne assignments, to C. T. Allen, New York, N. Y.

Application May 20, 1939, Serial No. 274,695

1 Claim. (Cl. 88—18.6)

This invention relates to a projector for motion picture film and more particularly to a projector adapted to project motion picture film upon the screen of an iconoscope or any other similar device.

As is well understood by those skilled in the art, television systems now in operation in this country are standardized to operate with a picture frequency of thirty pictures per second, each picture being made up, as will be understood, of two individual frames, one frame scanning the even numbered lines of the picture, the other scanning the odd numbered lines of the picture.

Motion pictures as customarily made in this country are taken and projected at the rate of twenty-four pictures per second, or as sometimes called, twenty-four frames per second, in this instance each frame being a complete picture.

Therefore, in order to provide for the television transmission of standard motion pictures, some means must be provided for converting the twenty-four pictures per second of the motion picture film to the sixty frames or thirty pictures per second of the television system.

It is an object of this invention to provide improved apparatus for projecting motion picture film made and adapted to be projected at twenty-four pictures per second, upon the transmitting screen of a television system adapted to transmit sixty frames or thirty pictures per second.

It is a further object of my invention to provide apparatus of the class described which is free from intermittent motion of parts of the apparatus and in which all moving parts rotate continuously at a constant rate of speed and in which the only member having an intermittent motion is a small section of the film adjacent the optical system.

It is a further object of my invention to provide a projector of the class described which does not employ the "Geneva" movement.

It is still a further object of my invention to provide apparatus of the class described in which the mechanical load or strain upon the film being projected is reduced to a minimum and in which the wear and tear upon the film in its passage through the apparatus is also reduced to a minimum.

Still other objects and advantages of my invention will be apparent from the specification.

In this application I have particularly pointed out and distinctly claimed the part, improvement or combination which I claim as my invention or discovery and I have explained the principles thereof and the best mode in which I have contemplated applying those principles so as to distinguish my invention from other inventions.

Figs. 3 to 7 inclusive are diagrammatic views of the film advance and shutter mechanism showing five positions during a complete cycle.

Figure 1:
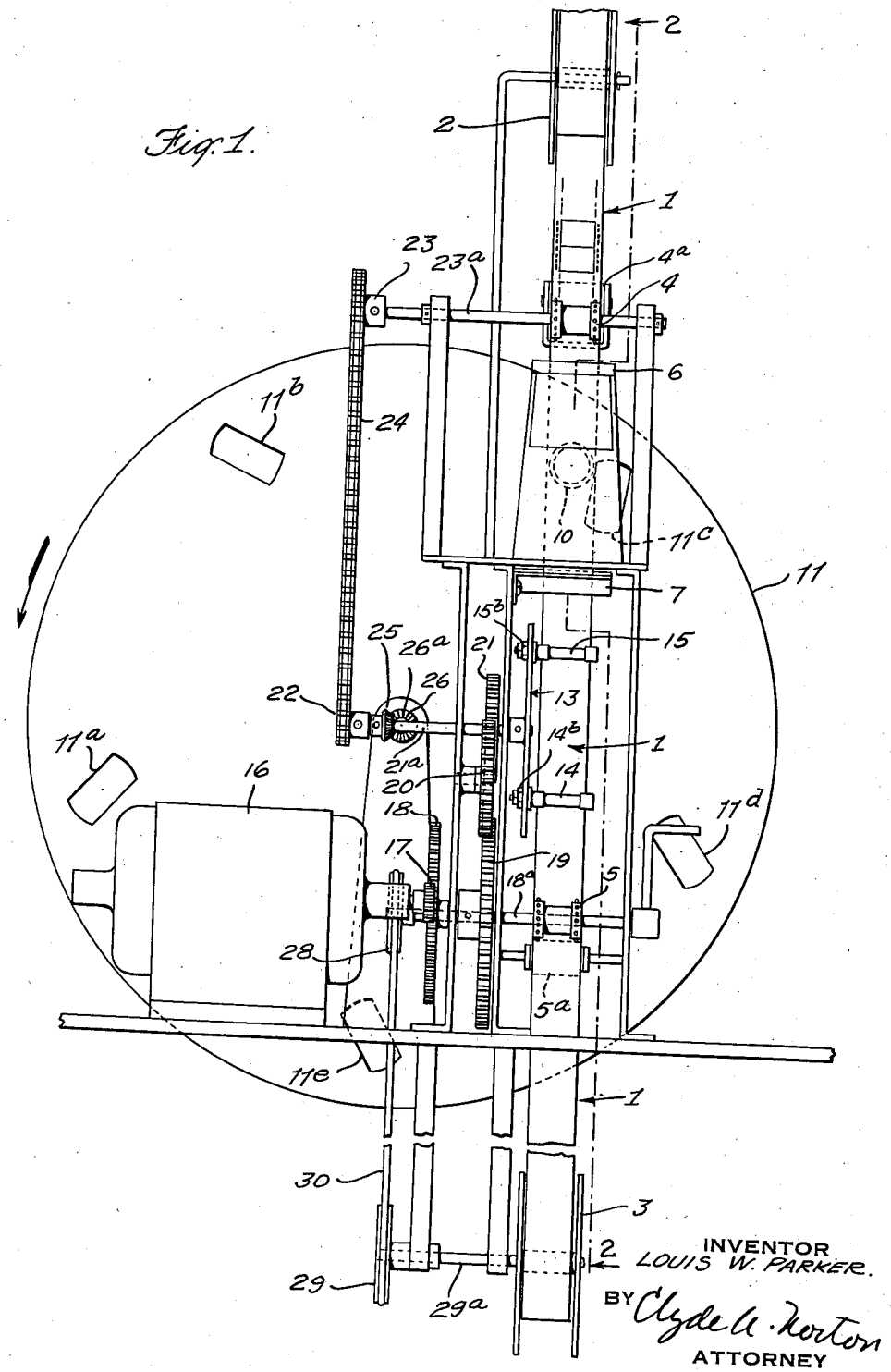
Figure 1 is a rear elevation of a projector in accordance with my invention.

Referring now more particularly to Fig. 1, numeral 1 represents a strip of film passing through the projector, being drawn from the feed reel 2 and wound upon the take-up reel 3. The film 1 is drawn from the spool 2 by the feed sprocket 4 with idler sprocket 4a which rotates at a constant speed and is fed to the take-up spool 3 by the take-up sprocket 5 and idler sprocket 5a which rotates at a constant speed, the same as that of sprocket 4. After passing over the feed sprocket 4, and being "looped," the film may pass through brake 6 comprising a pair of felt pads engaging the film on opposite sides, then through the film gate 8 where it is illuminated by lamp 8a, and then through the lower brake 7 similar to upper brake 6.

After passing through the lower brake 7, the film passes through the intermittent advance mechanism comprising disk 13 and fingers 14 and 15 carried thereby, which mechanism will hereafter be described more in detail, and then passes over the take-up sprocket 5.

While passing through the film gate, the film is projected by the lamp 8a whose light passes through the rear optical system 9, then through the film, then through the front optical system 10. Since the film gate and optical system employed form per se no part of my invention and are well known in the art, they are not described in detail.

Interposed between the front optical system 10 and the screen I may provide a shutter 11 which may be in the form of a disk having a series of openings, the disk being numbered 11 and the openings 11a, 11b, 11c, 11d and 11e respectively. After passing through the opening in the shutter, the picture is projected upon the screen 12 which may be the screen of an iconoscope tube.

Since the iconoscope tube and its operation is well known in the art and forms per se no part of this invention, the same is not described in detail.

The apparatus according to my invention is constructed and arranged to project upon the iconoscope screen sixty pictures per second from motion picture film made at the rate of twenty-four pictures per second, and which is fed through the feed and take-up sprockets at the rate of twenty-four pictures per second. This is accomplished by projecting alternate pictures a different number of times. For example, in the present embodiment of my invention, the apparatus projects frame A of the film upon the iconoscope screen three times, then projects frame B of the film twice, then frame C of the film three times, then frame D twice, and so on, each frame or picture, of course, being stationary while it is being projected and moving only in the interval between projections when movement is required. It will be understood that in the interval between two projections of the same frame, no movement of the film occurs. Likewise, between the projection of the same frame three times, no movement of the film occurs.

Before explaining how this intermittent movement is obtained, the mechanical relation of the various rotating parts will first be described.

The projector may be driven by any suitable means, such for instance, as motor 16, the shaft of which may carry a pinion 17 meshing with gear 18 on shaft 18a, which carries and drives the take-up sprocket 5. Also mounted on shaft 18a and secured thereto to rotate therewith I may provide a gear 19, this gear meshing with idler gear 20 which in turn may mesh with gear 21 secured to shaft 21a on which is mounted the film advance disk 13 carrying fingers 14 and 15. Shaft 21a may also carry bevel gear 25 meshing with bevel gear 26 on shaft 26a, on the front end of which may be mounted shutter disk 11.

Shaft 21a may carry sprocket 22, and shaft 23a, upon which is mounted the feed sprocket 4, may carry sprocket 23, sprockets 22 and 23 being connected together by means of chain 24.

Shaft 18a may also carry pulley 28, and shaft 29a, upon which is mounted the take-up spool 3, may carry a pulley 29, pulleys 28 and 29 being connected by means of belt 30.

The feed and take-up sprockets 4 and 5 may be provided with sixteen teeth around their circumference, and may rotate at the rate of six revolutions per second, as in conventional sound motion picture practice.

Since one frame of the film corresponds to four sprocket teeth, it will be apparent that each rotation of the sprocket advances the film four frames, and since these sprockets rotate at six revolutions per second, the film advance made by these sprockets will be twenty-four frames per second.

The diameter of idler gear 20 meshing with gear 19 is half the size of gear 19, whereby the idler gear will rotate at twice the speed of gear 19, or at twelve revolutions per second. The diameter of gear 21 carrying the film advance disk 13 is the same as that of idler gear 20, and the film advance disk will therefore rotate at twelve revolutions per second. The diameter of sprocket 23 is preferably twice that of sprocket 22, so that the feed sprocket 4 will rotate at six revolutions per second.

Gears 26 and 25 being the same diameter, the shutter disk mounted on shaft 26a will rotate at the same speed as the film advance disk 13 or at the rate of twelve revolutions per second.

Figure 2:
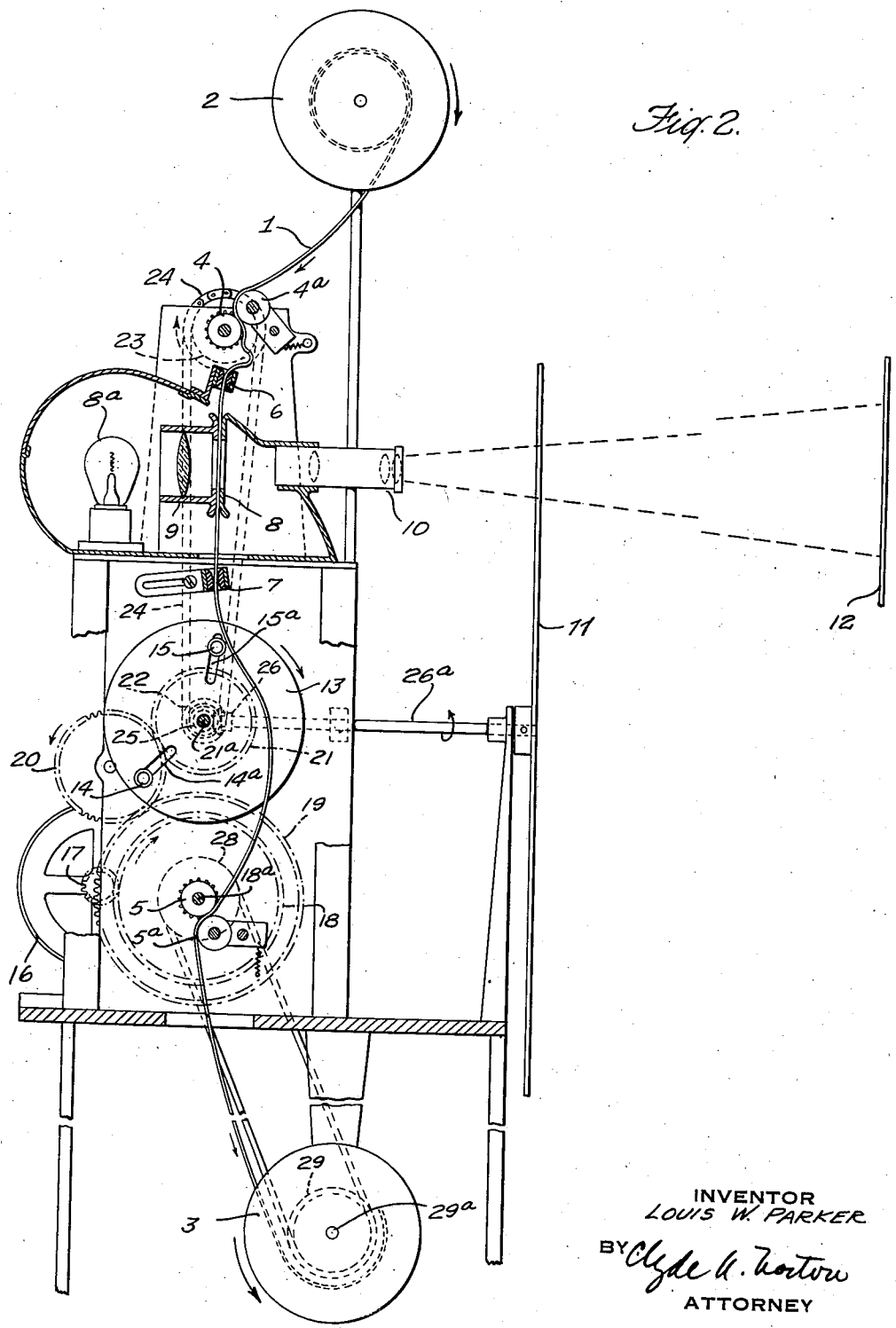
Fig. 2 is a sectional elevation thereof on line 2—2 of Fig. 1.

The mechanism by which the film is advanced one frame after the projection of two frames and three frames alternatively will now be explained with references to Figs. 3 to 7 inclusive and it may first be pointed out that for clarity of explanation, in these figures, the plane of the shutter disk 11 of the film has been rotated 90° so that the plane of the film advance disk 13 and the shutter disk coincide, although in the machine itself these planes are mutually perpendicular, as will be seen from Figs. 1 and 2 and there is actually no twist in the film.

In these figures the direction of the various motions have been indicated by arrows and it will be observed that the film is being continuously pulled downward by the take-up sprocket 5. This should be kept in mind for a clear understanding of the operation of the mechanism. Below the take-up sprocket 5 the movement of the film is uniform and constant, there being no intermittent motion. Above the sprocket 5, this is not the case.

Figure 3:
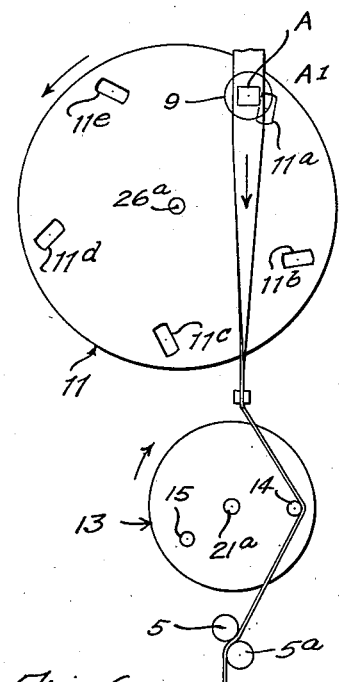

Referring now to Fig. 3, it will be seen that the opening 11a in the shutter disk is about to expose the first frame of the picture which may be called frame A. This exposure may be called exposure A1 indicating that it is the first exposure of this frame. At this point it should be noted that the finger 14 on the film advance disk 13 is at its maximum distance to the right of the center and continued rotation of this disk moves finger 13 inwardly toward the vertical center line. In the position shown in Fig. 3, the finger 14 has pulled the film down through the film gate to provide enough slack so that the film can take the position shown. This point may be regarded as the starting point of the cycle, but it will be apparent that any other point may be taken as the starting point.

During the passage of the opening 11a across the optical system, permitting the projection of frame A the first time, no movement of the film occurs. This is because as disk 13 rotates in the direction shown, finger 14 is moving in and leaving slack in the film. Although take-up sprocket 5 is rotating, it does not rotate fast enough to take up all of the slack and consequently the film above the take-up sprocket 5 remains stationary during the time of projection of frame A the first time.

Figure 4:
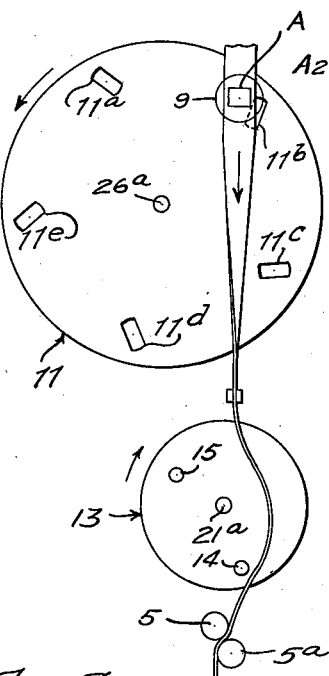

By the time the shutter disk 11 has rotated to the position shown in Fig. 4, where it is about to make the second exposure of frame A, the film advance disk 13 has rotated to the position shown in Fig. 4 but there is still slack in the film, not taken up by the take-up sprocket 5, and consequently as the shutter opening 11b moves across the optical system, permitting the exposure of frame A the second time, no movement of the film occurs within the film gate and frame A is again projected upon the screen.

Figure 5:
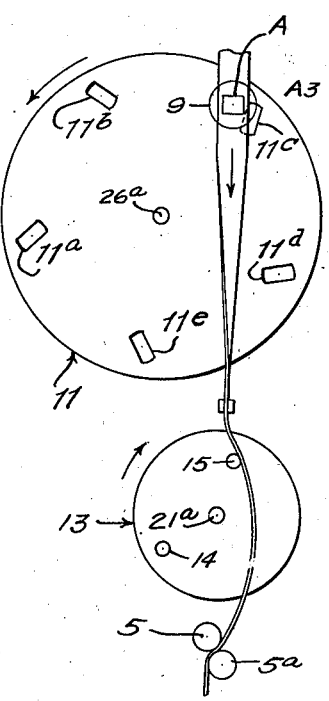
Figure 6:
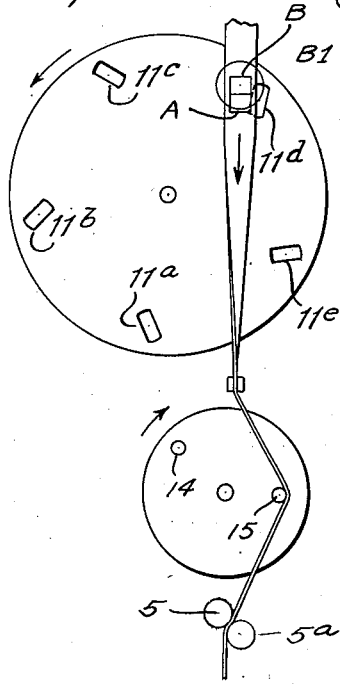

By the time the opening 11c has moved into the position shown in Fig. 5, the film advance disk 13 has rotated to the position shown in Fig. 5 but still the slack has not all been taken out of the film by the take-up sprocket 5, and passage of the shutter opening 11c across the optical system occurs, exposing frame A for the third time while that film is still stationary within the film gate. It will be noted, however, that at this point finger 15 is beginning to pass to its maximum distance to the right of center of the film and is therefore in position to pull the film down. What happens is shown in Fig. 6, in which the opening 11d in the shutter disk is now about to pass across the optical system. It will be observed that finger 15 has now passed to its maximum distance to the right of center and has drawn more slack in the film, this slack being obtained by drawing the film down one frame so that frame B is now within the film gate ready to be exposed. Passage of the opening 11d across the optical system now exposes frame B for the first time. The film within the film gate is stationary during this exposure because finger 15, having reached its maximum position to the right of center, is now moving backward towards center and is leaving slack in the film which cannot be taken up by the take-up sprocket 5 in time to move the film at this time.

Figure 7:
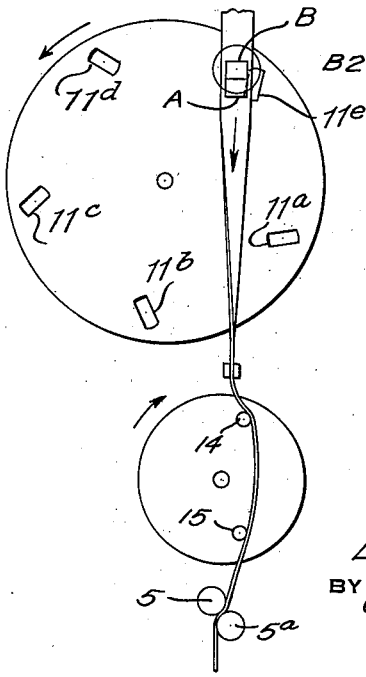

The last position of the cycle is shown in Fig. 7 in which opening 11e is about to cross the optical system, and finger 14 is just beginning to pass to the right of center. It has not yet, however, reached the position where it begins to draw the film down, and will not do so until after opening 11e has cleared the optical system so that in the passage of opening 11e across the optical system, frame B is projected for the second time.

After this occurs, the finger 14 begins to take up slack in the film and pulls the film down reaching the position shown in Fig. 3 initiating a second cycle. During this second cycle frame C will be exposed three times and frame D twice in the same manner that frame A was exposed three times and frame B twice.

In constructing the apparatus certain points should be kept in mind. It should be noted that fingers 14 and 15 do not lie on the same diameter. These fingers are spaced at a spacing of two-fifths and three-fifths of a revolution. That is to say, from finger 14 to finger 15, measuring clockwise the angular distance is preferably 144°; measuring counter-clockwise it is 216°.

Also it will be noted that fingers 14 and 15 should not be equidistant from the center. It will be clear that when finger 15 impinges on the film, there will be less slack in it than when finger 14 impinges upon the film, because there is a greater time interval between the time when 15 leaves the film and 14 strikes it than there is between the time when 14 leaves the film and 15 strikes it, and during these two unequal time intervals the slack is being taken out of the film at a constant rate by the take-up sprocket 5. Consequently 15 should be nearer to the center than 14 and their positions may best be determined by trial. The fingers 14 and 15 are preferably adjustably mounted in radial slots 14a and 15a and may be held in adjusted position by any suitable means such for instance as lock nuts 14b and 15b.

In visual observation of the projected film, a considerable amount of flicker may be noted. This is because the time of exposure of each frame is relatively short compared with the time for which the screen is not illuminated, but this is no drawback in the case of television transmission, because the picture is being scanned by the cathode ray beam during the dark interval and the iconoscope screen is being charged up during the interval when the picture is projected upon it. The time required for scanning is considerably longer than that required to charge the screen, the screen being charged during the "flyback" or return to initial position of the cathode ray beam.

While I have shown and described herein apparatus particularly designed and constructed to project standard size motion picture film, that is to say 36 millimeter film, it will be understood that the application of the same principles to produce a projector for handling other sizes of film is a relatively simple engineering matter.

While I have shown and described certain preferred embodiments of my invention, it will be understood that modifications and changes may be made without departing from the spirit and scope of my invention, as will be clear to those skilled in the art.

I claim:

In a projector of the class described, a take-up sprocket arranged to take up film at constant speed, a film gate, means for feeding film toward said gate at constant speed, and means between said take-up sprocket and said gate for pulling the film through said gate, said last mentioned means comprising an element mounted for rotation at constant speed in a plane perpendicular to the plane of the film, and having a pair of fingers arranged to engage the film and displace it sideways, said fingers being so placed on said disk element as to subtend angles of 144° and 216°, and said fingers being spaced at unequal distances radially from the center of said element.

LOUIS W. PARKER.